United States Patent
Wang et al.

(10) Patent No.: US 11,132,383 B2
(45) Date of Patent: Sep. 28, 2021

(54) TECHNIQUES FOR PROCESSING DATABASE TABLES USING INDEXES

(71) Applicant: salesforce.com, inc., San Francisco, CA (US)

(72) Inventors: Xiaodan Wang, Dublin, CA (US); Mikhail Chainani, San Francisco, CA (US); Alan Arbizu, San Mateo, CA (US); Ashwini Bijwe, Hayward, CA (US)

(73) Assignee: salesforce.com, inc., San Francisco, CA (US)

( * ) Notice: Subject to any disclaimer, the term of this patent is extended or adjusted under 35 U.S.C. 154(b) by 373 days.

(21) Appl. No.: 15/885,512

(22) Filed: Jan. 31, 2018

(65) Prior Publication Data

US 2019/0236201 A1    Aug. 1, 2019

(51) Int. Cl.
*G06F 16/27* (2019.01)
*G06F 16/22* (2019.01)
*G06F 16/2453* (2019.01)

(52) U.S. Cl.
CPC ........ *G06F 16/278* (2019.01); *G06F 16/2272* (2019.01); *G06F 16/2282* (2019.01); *G06F 16/2453* (2019.01)

(58) Field of Classification Search
CPC ............... G06F 16/278; G06F 16/2272; G06F 16/2282
See application file for complete search history.

(56) References Cited

U.S. PATENT DOCUMENTS

| | | | |
|---|---|---|---|
| 10,635,650 B1* | 4/2020 | Chud | G06F 16/2282 |
| 2011/0295838 A1* | 12/2011 | Collins | G06F 16/242 707/715 |
| 2014/0282556 A1* | 9/2014 | Fee | G06F 9/4843 718/101 |
| 2015/0032758 A1* | 1/2015 | Schneider | G06F 16/2272 707/741 |
| 2016/0301766 A1* | 10/2016 | Ionescu | G06F 16/172 |
| 2019/0163771 A1* | 5/2019 | Kirk | G06F 16/2237 |

* cited by examiner

*Primary Examiner* — Loc Tran
(74) *Attorney, Agent, or Firm* — Kowert, Hood, Munyon, Rankin & Goetzel, P.C.

(57) ABSTRACT

Techniques are disclosed relating to processing data stored within database tables in a parallelized manner. In various embodiments, a computer system maintains a database having a database table storing data for a plurality of tenants and an index structure storing indexes for accessing data stored in the database table. In some embodiments, the computer system receives, from a particular tenant, a request to perform a task that includes operating on particular data. In some embodiments, the computer system determines a portion of the index structure corresponding to the particular tenant and divides a range of indexes within that portion into a plurality of index sub-ranges. In various embodiments, the computer system processes portions of the task in parallel by determining an index sub-range for each of a plurality of threads and causing each of the threads to operate on a portion of the particular data specified by its index sub-range.

17 Claims, 9 Drawing Sheets

TECHNIQUES FOR PROCESSING DATABASE TABLES USING INDEXES

BACKGROUND

Technical Field

This disclosure relates generally to database systems and, more specifically, the parallelizing of operations on data in a database.

Description of the Related Art

Database management systems are typically employed to store data in an organized manner that can be efficiently accessed. Such systems may implement a relational model in which data is stored in a database as tables having rows and columns. These relational database systems are rarely optimized for handling tables that store data for more than one tenant. In particular, data blocks and access paths do not provide locality when accessing a tenant's specific data since data for multiple tenants may be interleaved in a table, causing the database system to have to read other tenants' data despite searching for data belonging to a certain tenant. Accordingly, data-intensive processing that scans all (or large portions) of one tenant's data becomes expensive, especially when a table stores data for thousands of tenants.

Figure 1:
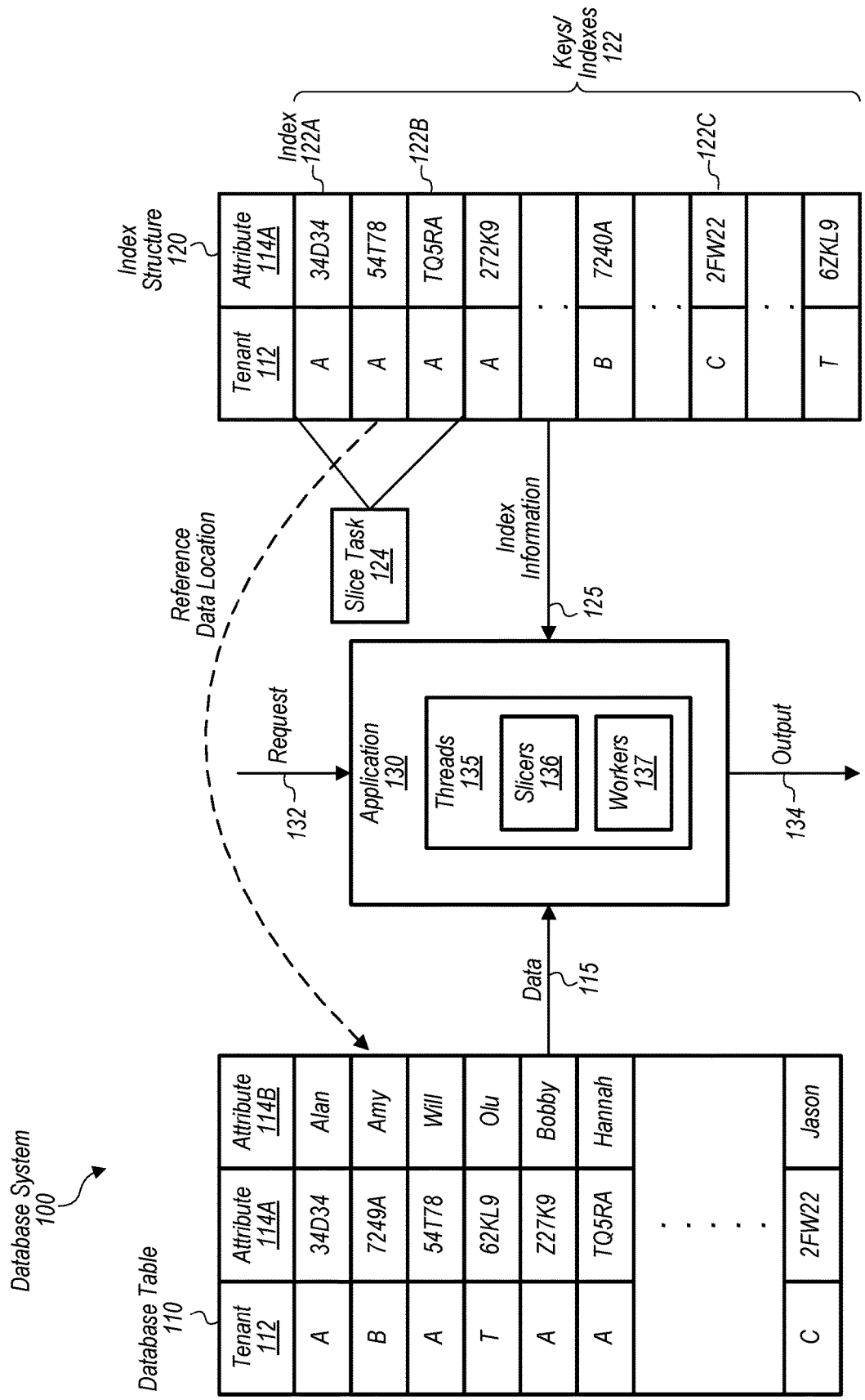
FIG. 1 is a block diagram illustrating example elements of a system that facilitates the processing of data in a parallelized manner using an index structure, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "node configured to execute an instance of a database management application" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a database system having eight nodes, the terms "first" and "second" nodes can be used to refer to any two of the eight nodes.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes various techniques for exploiting index locality in order to process database tables in a manner that is parallelized. In various embodiments described below, a system maintains: a database table storing data for one or more tenants of the system and an index structure storing indexes for accessing data in the database table. In such embodiments, after receiving a request to perform operations on data in the database table that belongs to a particular tenant, the system determines a portion of the index structure that corresponds to the particular tenant. In such embodiments, the system divides the indexes in the determined portion into one or more groups of indexes. In some embodiments, the system processes the one or more groups of indexes by assigning them to multiple threads and causing those threads to perform operations on the data corresponding to the indexes in their assigned index groups. This paradigm permits the threads to operate in parallel on the request for the particular tenant. As used herein, use of the phrase "in parallel" or "parallelization" in reference to performing a requested operation means that at least some portions of the operation are performed by different processing circuits. These different processing circuits may be, without limitation, different processing cores on a single integrated circuit, different processors on distinct devices, etc. The phrase "in parallel" does not require perfect synchronicity, or that each portion of the operation is performed by a different processing circuit, merely that at least two portions of the requested operations are performed by different processing circuits. Such an approach may, in some cases, mean that two different portions of a requested operation are being performed at the same moment in time on different hardware.

These techniques may be advantageous over prior approaches as these techniques enable massive parallelism (e.g., thousands of threads against a single database table) and better leverage distributed compute resources (e.g. by using idle threads) in order to reduce the runtime of data intensive tasks. Accordingly, as the data sizes of the various tenants of a system grow organically and use cases become more sophisticated, these techniques may scale as well, preventing the customer experience from being adversely affected by the data growth. A system for implementing these techniques will now be described in more detail below, starting with FIG. 1.

Turning now to FIG. 1, a block diagram of a database system 100 is shown. In the illustrated embodiment, system 100 includes a database table 110, an index structure 120, and an application 130. As further shown, database table 110 includes a tenant column 112 and two attribute columns 114A and 114B. While index structure 120 is shown as a table, in some embodiments, structure 120 may take others forms, such as a B-tree or B+ tree that includes the same keys/indexes 122 as the table. While not shown, application 130 may be executed on a server system of system 100. In some embodiments, system 100 may be implemented differently than shown—e.g., database table 110 may be associated with multiple index structures 120.

System 100, in various embodiments, is a set of software routines, hardware, or a combination thereof that implements a database-management system capable of interacting with tenants, applications, and databases in order to store, analyze, and serve data. System 100 may execute software routines (such as application 130) from various, different users (e.g., providers and tenants of system 100) as well as provide code, forms, web pages, and other data to users of system 100, databases of system 100, and other external entities that are associated with system 100. In various embodiments, system 100 stores database table 110 and index structure 120 in databases of system 100 (which are not depicted).

Database table 110, in various embodiments, is a collection of data elements which are organized into a structured format having rows and columns. In some implementations, the columns may define subsets of data (e.g., categories) within table 110 for which rows provide values. Consider tenant column 112 for example. In some embodiments, system 100 stores data for multiple tenants in the same database table 110. Thus, in embodiments in which database table 110 stores data for multiple tenants, table 110 may include a column defining tenant as a subset of data under which each row of table 110 specifies a tenant corresponding to that row. In addition to tenant column 112, database table 110 may include additional columns such as attributes 114A and 114B under which tenants store particular data. For example, attribute 114A may specify a column of unique user IDs while attribute 114B may specify a column of first names. In some embodiments, the values under columns 112, 114A, and 114B are retrieved as data 115 by applications of system 100, including application 130.

In various embodiments, a given row of table 110 can be uniquely identified by the values appearing in particular columns of table 110. These particular columns that include only unique values for each row may be referred to as candidates. In various embodiments, a candidate is selected from a set of candidate to build an index structure 120 such that the indexes in index structure 120 uniquely refer to rows in database table 110. For example, a column of unique user IDs may be used such that a given user ID identifies a particular row of table 110. In some embodiments, a given row of table 110 is uniquely identified by a combination of two or more columns—called a composite index (or key). (The term "indexes" is used interchangeably with the term "keys".) A composite index may identify a row within table 110 when the combination of columns is guaranteed to be unique even when the columns taken individually are not unique. Composite indexes, in various embodiments, may be used to build index structure 120.

In some embodiments, the data elements stored in table 110 are arranged according to a column (e.g., an index-organized table). Even if table 110 is arranged according to some ordering, locating a particular row in table 110 may involve reading all rows in table 110. Moreover, the rows of data for a given tenant may be interleaved with rows of data belonging to another tenant. As shown, for example, the rows belonging to tenant A are not grouped, but are separated by rows belonging to tenants B and T. Thus, in various cases, locating a particular row for one tenant involves reading rows belonging to another tenant. Furthermore, reading all the rows of table 110 into memory in order to search for a particular row is not efficient. Accordingly, in various embodiments, system 100 maintains index structure 120 in order to improve the speed of data retrieval operations on table 110.

Index structure 120, in various embodiments, is a collection of index elements that are usable to locate data elements within database table 110. Index structure 120 may store indexes 122 (e.g., primary keys, candidate keys, or composite keys) that uniquely identify the rows in table 110. As shown, for example, index structure 120 stores composite indexes that are made of a combination of the values from tenant column 112 and attribute column 114A. For example, index 122A is the value (A, 34D34). In some embodiments, indexes 122 stored in structure 120 are stored with a pointer or a reference to the row in table 110 that includes the corresponding data. Accordingly, a given row within table 110 may be located by first locating the corresponding pointer in structure 120 using an index 122 that corresponds to that row. In some embodiments, index structure 120 includes the corresponding data with the index 122 (instead of a pointer). Indexes 122 and their associated pointers (or their associated data) are retrieved as index information 125 by applications of system 100, including application 130.

Application 130, in various embodiments, is a set of software routines executable to process requests 132 to store, analyze, and/or provide data. Application 130, in various embodiments, parallelizes operations performed on data stored in table 110 by exploiting index structure 120. To parallelize such operations, in some embodiments, application 130 defines a slicer task and a slice task 124. Threads 135 implementing application 130 may perform these tasks—these threads being referred to as slicers 136 and workers 137 when performing the tasks. In some embodiments, a slicer 136 traverses through index structure 120 and divides a range of its indexes 122 into index groups/sub-ranges. A slicer 136 may then store slice tasks 124 that identify those index groups. In various embodiments, a slice task 124 defines a pair of index bounds that include some set amount of indexes 122 that correspond to rows in table 110. For example, a particular slice task 124 may specify index 122A as a lower bound and index 122B as an upper bound. In some embodiments, a worker 137 processes a slice task 124 by performing operations on data 115 corresponding to the indexes 122 within the bounds (including the indexes 122 that define the bounds, in some cases) specified by that slice task 124. In some embodiments, slicers 136 and workers 137 operate in parallel such that new slice tasks 124 are created while already created tasks 124 are being processed by workers 137. In various embodiments, the processing of slice tasks 124 produces an output 134.

In one implementation of system 100, application 130 may receive a request 132 from a user that specifies a set of operations to be performed on particular data residing in table 110. Request 132 may identify which indexes 122 of the user are relevant in completing the request. For example, a provider of system 100 may issue request 132 in order to move a particular customer's data from one database to another. Accordingly, such a request 132 may indicate all the indexes 122 within index structure 120 (corresponding to the relevant database table 110) that are associated with the customer. After receiving a request 132, in such an implementation, a slicer 136 (i.e., a thread 135 serving as a slicer 136) identifies a portion of index structure 120 that stores indexes 122 for the tenant identified in request 132. The slicer 136 may then divide a range of indexes 122 in that portion into sub-ranges (e.g., ranges of indexes 122) based on some criteria (e.g., every sub-range includes seven indexes 122). In such an implementation, the slicer 136 specifies the sub-ranges in slice tasks 124 that are stored in one or more queues from which workers 137 (i.e., threads 135 serving as workers 137) retrieve the slice tasks 124. Accordingly, workers 137 may traverse index structure 120 to the relevant indexes 122 specified in their retrieved slice task 124 and then may perform the set of operations indicated in request 132 on the data referenced by indexes 122. This implementation may be advantageous as it may allow for improved processing speeds on large database operations by parallelizing the work among multiple threads. Said differently, the range of indexes corresponding to the data being operated on may be distributed among multiple threads such that work of processing the data is divvied up between those threads. One method for creating slice tasks 124 will now be described in more detail with regards to FIG. 2.

Figure 2:
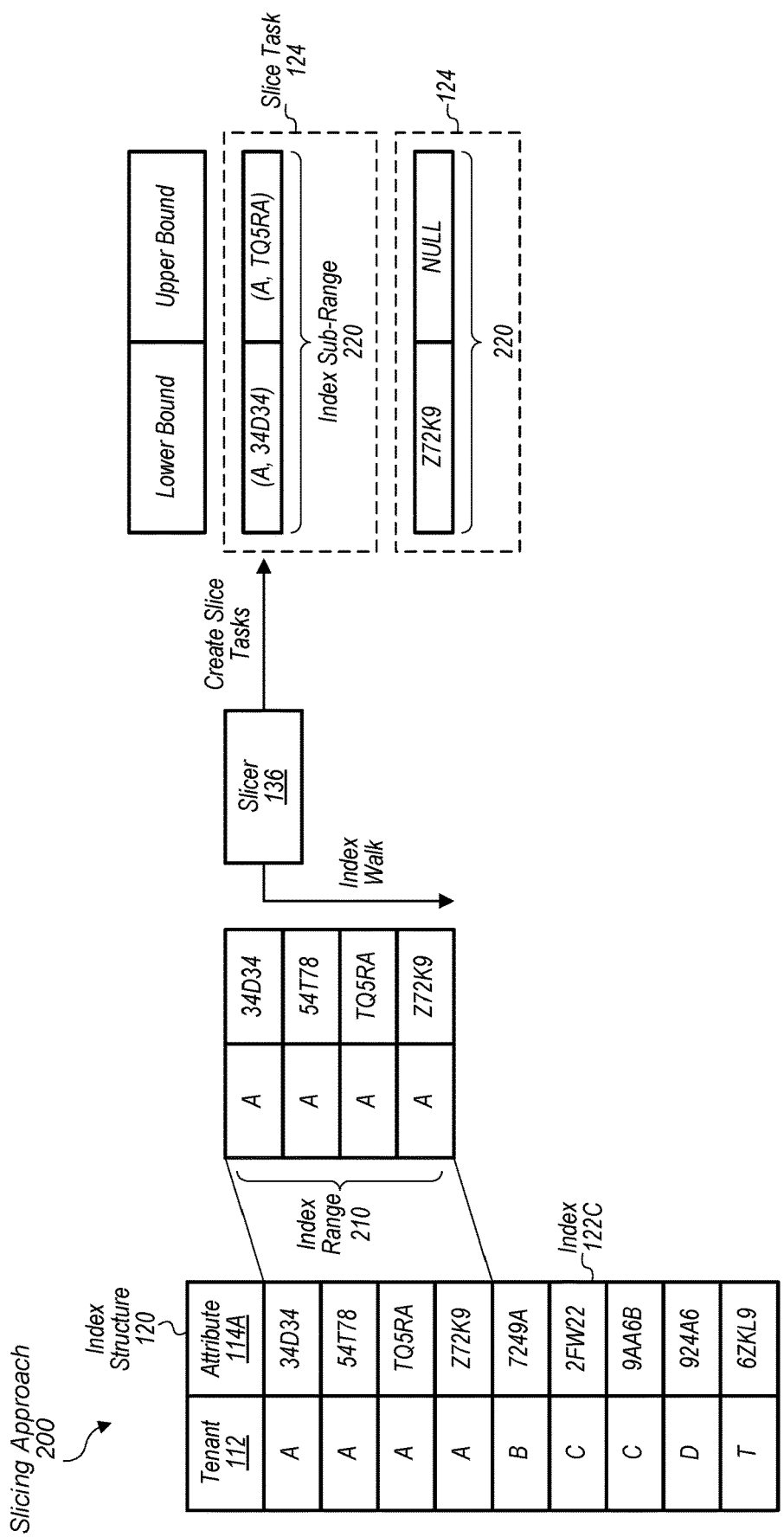
FIG. 2 is a block diagram illustrating example elements of an approach for creating slice tasks, according to some embodiments.

Turning now to FIG. 2, a block diagram of a slicing approach 200 for creating slice tasks 124 is depicted. In the illustrated embodiment, slicing approach 200 includes an index structure 120, an index range 210, and index sub-ranges 220 (or index groups). In some embodiments, index structure 120 may be implemented differently than shown— e.g., index structure 120 may be a B-tree or a B+ tree.

As depicted in FIG. 1, system 100 may be accessible to various users (e.g., tenants) and may store data for those users within the same database table (e.g., table 110). This arrangement leads to the need to access, for a particular user, data stored within a particular database table such as table 110. Thus, in some embodiments, index structure 120 is used to store indexes 122 that include an identifier (e.g., a value from tenant column 112) of the tenant corresponding to the data referenced by that index 122. This identifier, however, may not be unique among indexes 122. Accordingly, in various embodiments, indexes 122 may be composite indexes that include additional values that, when used with the value from tenant column 112, uniquely identify a row within table 110. As depicted, for example, indexes in index structure 120 (e.g., index 122C) may be composed of a value from tenant column 112 and a value from attribute column 114A. Structure 120 may be arranged (e.g., sorted) based on the ordering of the values included in indexes 122. For example, as shown, index structure 120 is first arranged (or ordered) by tenant 112 values and then by attribute 114A values.

In various embodiments, a slicer 136 initially determines an index range 210 based on request 132. Accordingly, in some embodiments, request 132 may indicate an index range 210—e.g., by specifying all indexes 122 belonging to a particular tenant. For example, request 132 may specify that all data of the particular tenant is to be moved from one database to another database. This operation may thus involve all indexes 122 of that tenant. As another example, each index 122 may specify, for a particular index structure 120, a value of (tenant, tenant's customer, unique ID). Accordingly, a request 132 may specify that particular operations be performed on data of a particular tenant's customer. This operation may thus involve only a subset of indexes 122 belonging to that tenant. After determining an index range 210, in various embodiments, slicer 136 walks the index range 210 and divides its indexes 122 into index sub-ranges 220.

In various embodiments, index sub-ranges 220 are created by grouping one or more indexes 122. The particular number of indexes 122 in a given sub-range 220 may depend on different conditions. In various embodiments, application 130 might spawn only a certain number of threads 135 that can serve as workers 137. Accordingly, index sub-ranges 220 (and thus slice tasks 124) may be created such that a given worker 137 is provided a particular number of sub-ranges 220 to process. Consider an example in which there are 100 threads processing 1000 rows of data. In order to keep each thread 135 occupied, 100 slice tasks 124 may be created that each specify a sub-range 220 that includes ten indexes 122. In some embodiments, index sub-ranges 220 are defined such that a given sub-range 220 references a certain amount of data (e.g., 50 MB of data). For example, each row in a datable table 110 may be about 2 MB— application 130 may be able to determine an approximate size of rows in a table 110 based on certain characteristics of table 110 (e.g., number of columns, types of columns, etc.). Accordingly, in this example, a given sub-range 220 may include 25 indexes 122, referencing a total of 50 MB of data in table 110. In various embodiments, a slicer 136 may define sub-ranges 220 by numbering of indexes 122 until the desired number of indexes 122 is reached and then groups them based on bounds. That is, a slicer 136 may walk index range 210 and count indexes 122 until a certain number have been counted. The slicer 136 may then reference the counted indexes 122 by creating a slice task 124. In embodiments in which index structure 120 is a B+ tree, a slicer 136 may start at a particular index 122 in a leaf node of that B+ tree. The slicer 136 may then traverse through the leaves and define sub-ranges 220. After creating a given slice task 124, in various embodiments, a slicer 136 enqueues that created slice task 124 into a queue that is accessible to workers 137.

In one instance, a slicer 136 may receive a request 132 to move all of tenant A's data from one database to another. In this instance, the particular slicer 136 may determine an index range 210 from index (A, 34D34) to index (A, Z72K9) as such a range encompasses all of tenant A's data. The particular slicer 136 may be instructed (by request 132) or designed to create index sub-ranges 220 that each have three indexes 122. The particular slicer 136 might start from index (A, 34D34). As such, the particular slicer 136 may, define for a particular sub-range 220, index (A, 34D34) as a lower bound. In this example, the particular slicer 136 might count index (A, 54T78) as the second index 122 and then might define, for that sub-range 220, index (A, 54T78) as the upper bound. The particular slicer 136 may then create a slice task 124 that specifies this sub-range 220. Continuing through the index range 210, the particular slicer 136 may define another index sub-range 220 that specifies index (A, Z72K9) as a lower bound. In the case that there are not enough remaining indexes 122 to constitute three indexes, that index sub-range 220, might not specify an upper bound.

In some embodiments, a single slicer 136 may traverse through index structure 120, creating slice tasks 124. In other implementations, the process of creating slice tasks 124 can be parallelized such that multiple slicers 136 work together on the same structure 120. In embodiments in which multiple slicers 136 are used, index structure 120 might be divided by an initial slicer 136 into various index segments that do not share overlapping index ranges 210. These various index segments may then be processed by different slicers 136 that traverse through the indexes 122 within these segments, creating slice tasks 124. In some embodiments, dividing index structure 120 into index segments involves sampling the index structure at different points and then creating bounds based on those points. In some embodiments, an initial slicer 136 samples index structure 120 at certain points (e.g., one index per every thousand indexes) and then creates index segments based on the sampled indexes 122. For example, an initial slicer 136 may sample at index (A, TQ5RA) and index (C, 2FW22) and then may create index segments (NULL, (A, TQ5RA)) and ((A, TQ5RA), (C, 2FW22)) where the lower bound is excluded from being processed. In embodiments in which index structure 120 is a B+ tree, the initial slicer 136 may traverse to an intermediate block and then may create index segments based on the pointers in that block.

By walking index range 210 and creating slice tasks 124 specifying sub-ranges 220, slicers 136 may facilitate the parallelization of the work in processing a given request 132 by dividing that work into smaller segments via sub-ranges 220. These smaller segments may then each be processed by a respective worker 137. An example of a methodology for processing slice tasks 124 is now described with respect to FIG. 3.

Figure 3:
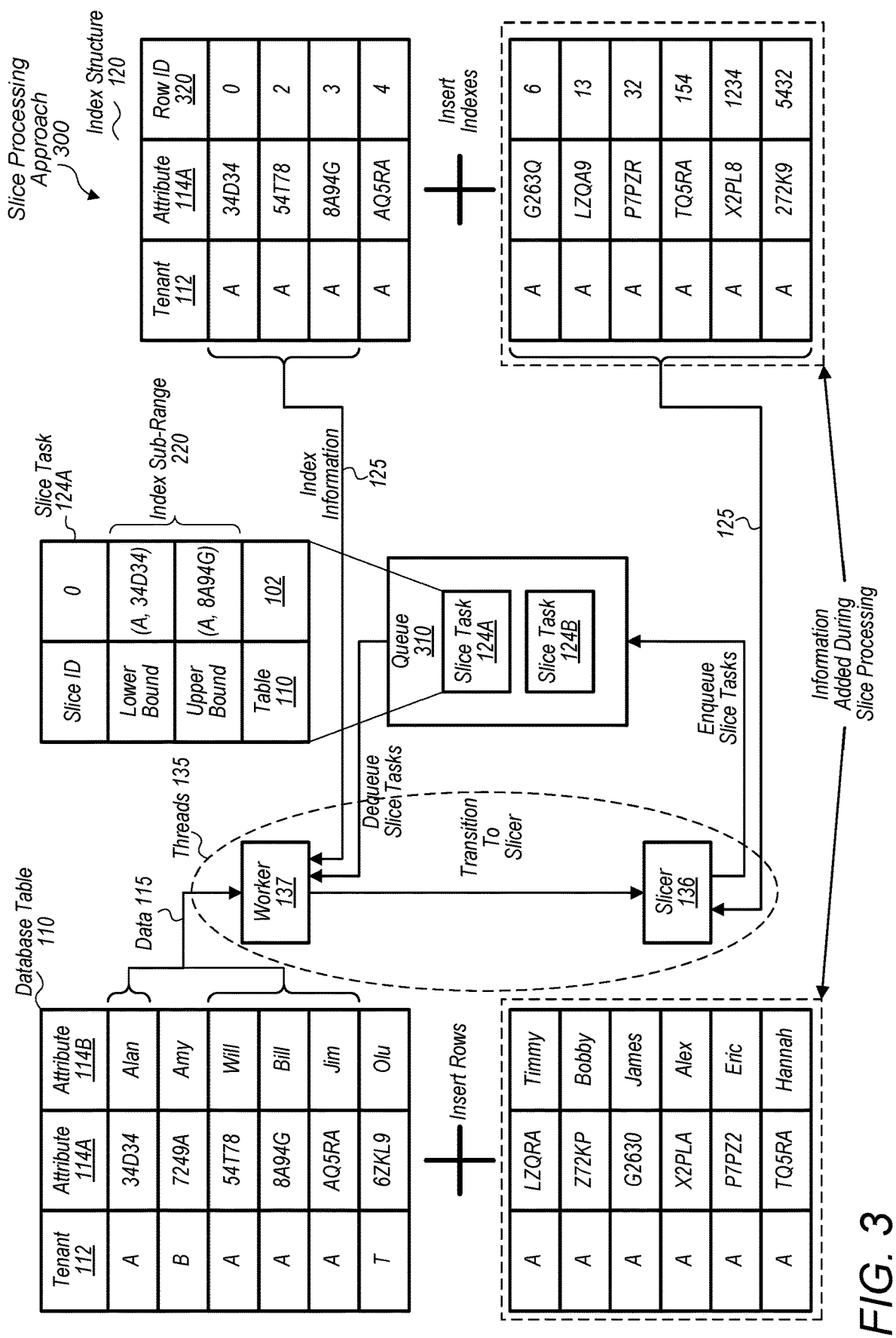
FIG. 3 is a block diagram illustrating example elements of an approach for processing data corresponding to a slice tasks, according to some embodiments.

Turning now to FIG. 3, a block diagram illustrating one embodiment of slice processing approach 300 for processing slice tasks 124 is shown. In the illustrated embodiment, slice processing approach 300 involves a database table 110, an index structure 120, a worker 137, and a queue 310. As shown, queue 310 includes two slice tasks 124A and 124B that are accessible to worker 137. Additionally, while only one worker 137 is shown (for simplicity), in various embodiments, multiple workers 137 may process tasks 124 in parallel. In some embodiments, various others methodologies for processing slice tasks 124 may be implemented. For example, in one such embodiment, threads 135 are not permitted to transition from being a worker 137 to becoming a slicer 136.

As mentioned with respect to FIG. 1, threads 135 may performs various functions to process a request 132. Based on the particular functions being performed, threads 135 may be referred to using different terms. For example, when processing a slicer task, a thread 135 is referred to herein as a "slicer" or a "slicer thread." Similarly, when processing a slice task 124 (that is, processing a task that has been set up by a slicer task), a thread 135 is referred to as a "worker" or "worker thread." Thus, for purposes of this disclosure, threads 135 may be referred to as either slicers or workers, depending on their current function. Note that some threads 135 may switch roles—for example, from a worker to a slicer. Thus, the same thread 135 may be referred to as having different roles at different points in time.

Threads 135, in various embodiments, continually check queue 310 for any slice tasks 124 that have been enqueued by a slicer thread 136. After a task 124 has been enqueued in queue 310, a thread 135 may retrieve that slice task 124 from queue 310 (taking on the role of a worker 137) and begin processing the data referenced by the sub-range 220 included in that slice task 124. In various embodiments, worker thread 137 (i.e. that thread 135) walks the specified sub-range 220 and uses the pointer data (e.g., row IDs 320) associated with each index 122 to access the corresponding data within table 110. In various embodiments, after accessing the corresponding data 115, worker 137 processes the data using the logic (e.g., program instructions) that is specified in request 132 or by the slice task 124. As an example, worker 137 may move the data from one database to another. While processing a given slice task 124, in various embodiments, worker 137 creates a checkpoint that allows itself or another worker 137 to pick-up from the checkpoint—such a case is discussed in more detail with regards to FIG. 4.

While processing a given slice task 124, in some embodiments, a given worker thread 137 may become a slicer thread 136 in order to break that slice task 124 into multiple slice tasks 124 that include a sub-range of the sub-range 220 specified in the slice task 124 that is being broken up. Worker thread 137 may transition to a slicer thread 136 for various reasons, including a given slice task 124 taking longer to process than expected.

In various instances, information may be added by a tenant to a database table 110 (causing corresponding indexes 122 to be added to structure 120) during slice processing approach 300. This is shown graphically in FIG. 3 by the notations "Insert Rows" and "Insert Indexes." To ensure that this data is processed, it may be desirable for the last of slice tasks 124 (which may also be referred to as the trailing slice task) created for database table 110 to specify no upper bound, thus allowing additional indexes 122 to be added to index structure 120 while request 132 is being processed. Accordingly, processing of the last slice task 124 may involve processing more rows in table 110 than is defined for other ones of slice tasks 124. (Such a definition may be based, for example, on a system parameter that specifies that each slice task 124 corresponds to 50 rows in table 110 or should take some particular amount of time (e.g., 10 hours).

After transitioning from being a worker thread 137 to a slicer thread 136, in various embodiments, thread 135 may traverse index structure 120 and divide the index sub-range 220 of a particular slice task 124 (e.g., one that is taking too long) into multiple slice tasks 124. By creating multiple slice tasks 124, application 130 may ensure that the remaining work of request 132 is parallelized among threads 135 of application 130.

Techniques described above may be useful for parallelizing the work required to operate on data of a particular tenant. But in a multi-tenant environment, it may be desirable to make sure that requests from different tenants are handled in a timely fashion. For this reason, work on a request from a particular tenant may, in some situations, need to be saved and picked backed up at a later point in time. An iterative scheme for creating slice tasks 124 and processing them in this manner will now be discussed with regards to FIG. 4.

Figure 4:
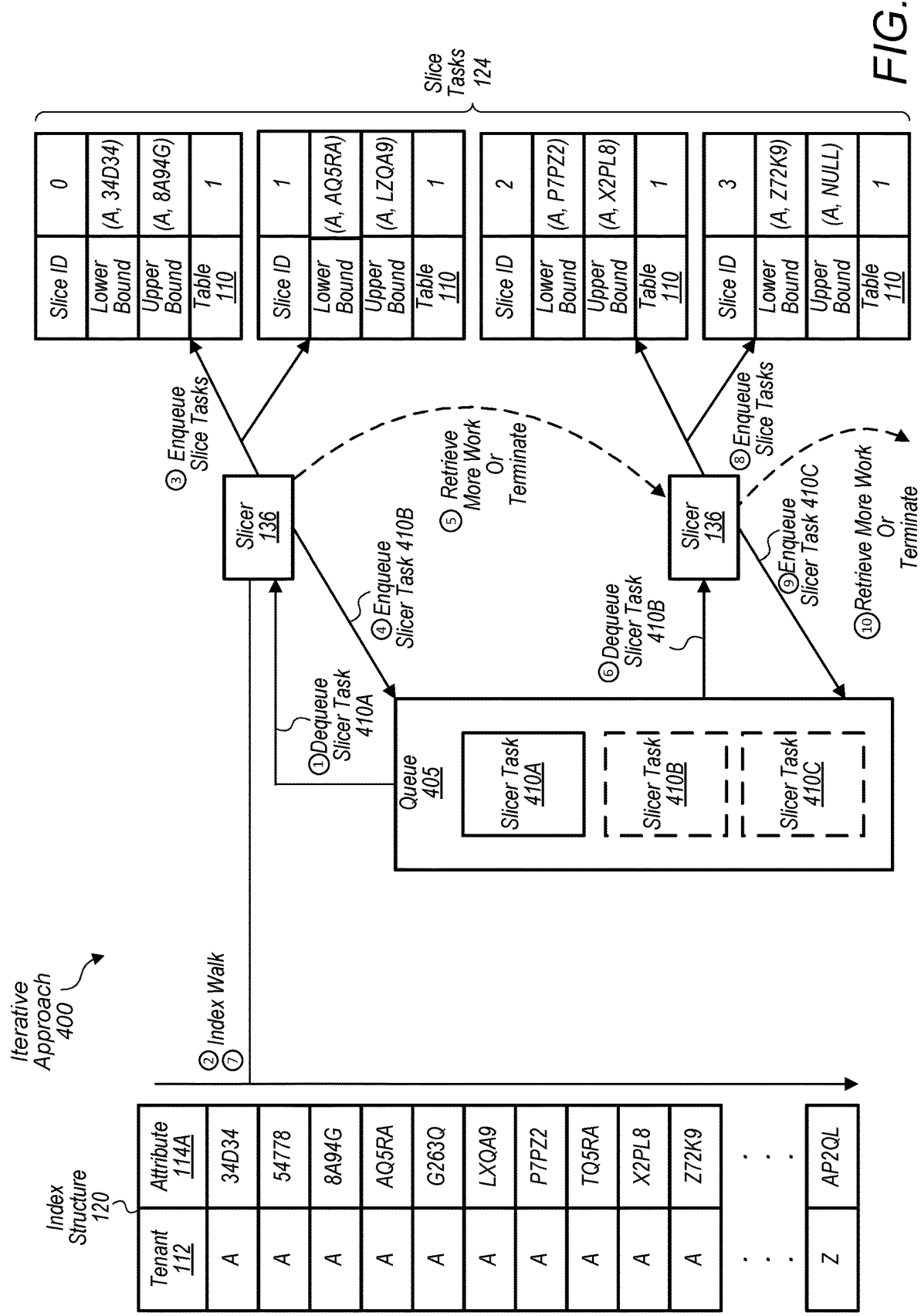
FIG. 4 is a block diagram illustrating example elements of an approach for creating slice tasks in an iterative manner, according to some embodiments.

Turning now to FIG. 4, a block diagram of iterative approach 400 for creating slice tasks 124 is shown. In the illustrated embodiment, approach 400 includes an index structure 120, multiple slicer tasks 410, and multiple slice tasks 124. In some embodiments, approach 400 may be implemented differently than shown—e.g., a thread 135 may transition from a slicer task 410 to a slice task 124.

After receiving a request 132, in various embodiments, application 130 enqueues a slicer task 410A in queue 405. Note that queue 405 may be the same as queue 310. In some cases, slicer task 410A may be request 132. Slicer task 410 may specify an index range 210, a starting index 122, and/or a particular database table 110. In some embodiments, a given thread 135 retrieves slicer task 410A (becoming a slicer thread 136) and starts walking index range 210, beginning from the starting index 122. In some embodiments, slicer 136 is instructed or designed to enqueue a particular number of slice tasks 124 per slicer task 410. In the illustrated embodiment, a slicer task 410 results in two slice tasks 124 being created and enqueued. After creating the particular number of slice tasks 124, in some embodiments, slicer 136 enqueues a second slicer task 410B that specifies the next index 122 to be processed so that the remaining indexes 122 within index range 210 may be divided into sub-ranges 220 and enqueued as slice tasks 124. In various embodiments, after enqueuing slicer task 410B, slicer 136 then terminates (i.e., the given thread 135 terminates). In some embodiments, slicer 136 does not terminate but instead processes other work (e.g., slice tasks 124, slicer task 410B, etc.). In various embodiments, another given thread 135 (or the same thread 135 above) retrieves slicer task 410B, continues where task 410A left off, creates two slice tasks 124, enqueues a third slicer task 410C, and terminates. This process may be repeated until all necessary slice tasks 124 have been created.

In various embodiments, a scheme similar to approach 400 is used to process slice tasks 124. In particular, a thread 135 may retrieve a slice task 124 (becoming a worker 137) and may begin accessing the corresponding data referenced by that slice task 124. In some embodiments, a worker 137 is instructed or designed to process a particular amount of data corresponding to a particular number of indexes 122—e.g., process a particular number of rows in database table 110. In some embodiments, a worker 137 works on a slice task 124 for a particular period of time, After processing the particular amount of data (or spending a particular amount of time on a task 124), the worker 137 enqueues a second slice task 124 that specifies the next index 122 of the sub-range 220 as the lower bound—the upper bound remains the same as the original slice task 124. The worker 137 may then terminate or process other work. In various embodiments, another thread 135 (or the same thread 135) retrieves the second slice tasks 124, continues where the slice task 124 left off, processes a particular amount of data (e.g., processes another ten rows in table 110), enqueues a third slice task 124, and then terminates. This process may be repeated until all data corresponding to the sub-range 220 of the initially retrieved slice task 124 has been processed.

Figure 5:
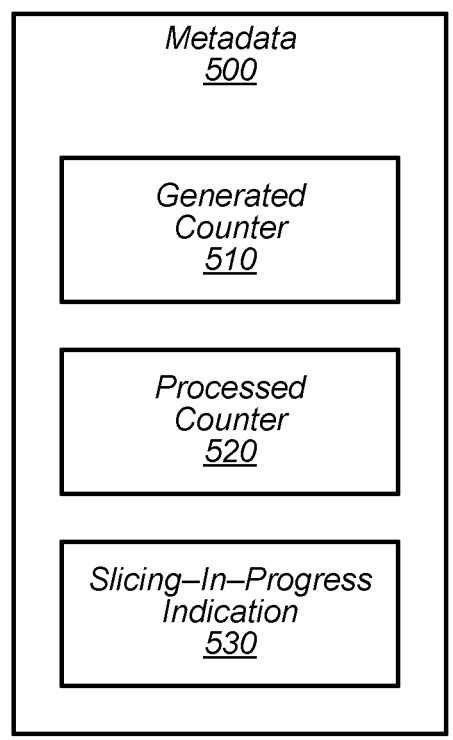
FIG. 5 is a block diagram illustrating example elements of metadata that is usable to track the progress of processing data, according to some embodiments.

Turning now to FIG. 5, a block diagram of metadata 500 is shown. In the illustrated embodiment, metadata 500 includes a generated counter 510, a processed counter 520, and a slicing-in-progress indication 530. In various embodiments, metadata 500 includes other additional information or different information—e.g., metadata 500 may include tenant IDs that map to a respective counter 510, counter 520, and indication 530 for a corresponding tenant of system 100.

Metadata 500, in various embodiments, includes information that is usable to track the progress of system 100 in completing a request 132. Metadata 500 may be stored in various manners (e.g., key-value pairs) in a database accessible to application 130 (and its threads 135). In various embodiments, metadata 500 specifies a generated counter 510 that indicates the number of slice tasks 124 that have been generated in processing a database table 110. When a slicer 136 generates and enqueues a slice task 124 in a queue 310, that slicer 136 may increment generated counter 510 so that it indicates that a new slice task 124 has been generated. In various embodiments, metadata 500 specifies a processed counter 520 that indicates the number of slice tasks 124 that have been processed by workers 137. When a worker 137 has processed all data referenced by a slice task 124, that worker 137 may increment processed counter 520 so that it indicates that another slice task 124 has been processed. In various embodiments, metadata 500 specifies a slicing-in-progress indication 530 that indicates whether all necessary slice tasks 124 has been created for a database table 110. After a slicer 136 enqueues the last slice task 124 (i.e. finished slicing index range 210), that slicer 136 may set indication 530 to indicate that all necessary slice tasks 124 have been created for the particular database table 110.

In various embodiments, after a worker 137 increments processed counter 520, that worker 137 checks the corresponding slicing-in-progress indication 530 to determine if it indicates that all necessary slice tasks 124 have been created for the corresponding table 110—i.e., no new slice tasks 124 will be added to queue 310 for that table 110. If all necessary slice tasks 124 have been created, then that worker 137 may check whether the generated counter 510 is equal to the processed counter 520. When both conditions are satisfied (e.g., no new slice tasks 124 are being created for a table 110 and all created slice tasks 124 for that table have been processed), that worker 137 may store an indication in metadata 500 that the relevant table 110 has been processed. In some embodiments, other entities (e.g., slicers 136) in system 100 check these conditions and indicate whether a given table 110 has been processed. In various embodiments, after all tables 110 specified in a request 132 have been processed, application 130 provides a notification to the relevant requestor (e.g., tenant, provider, etc.) that their request 132 has been completed.

Figure 6:
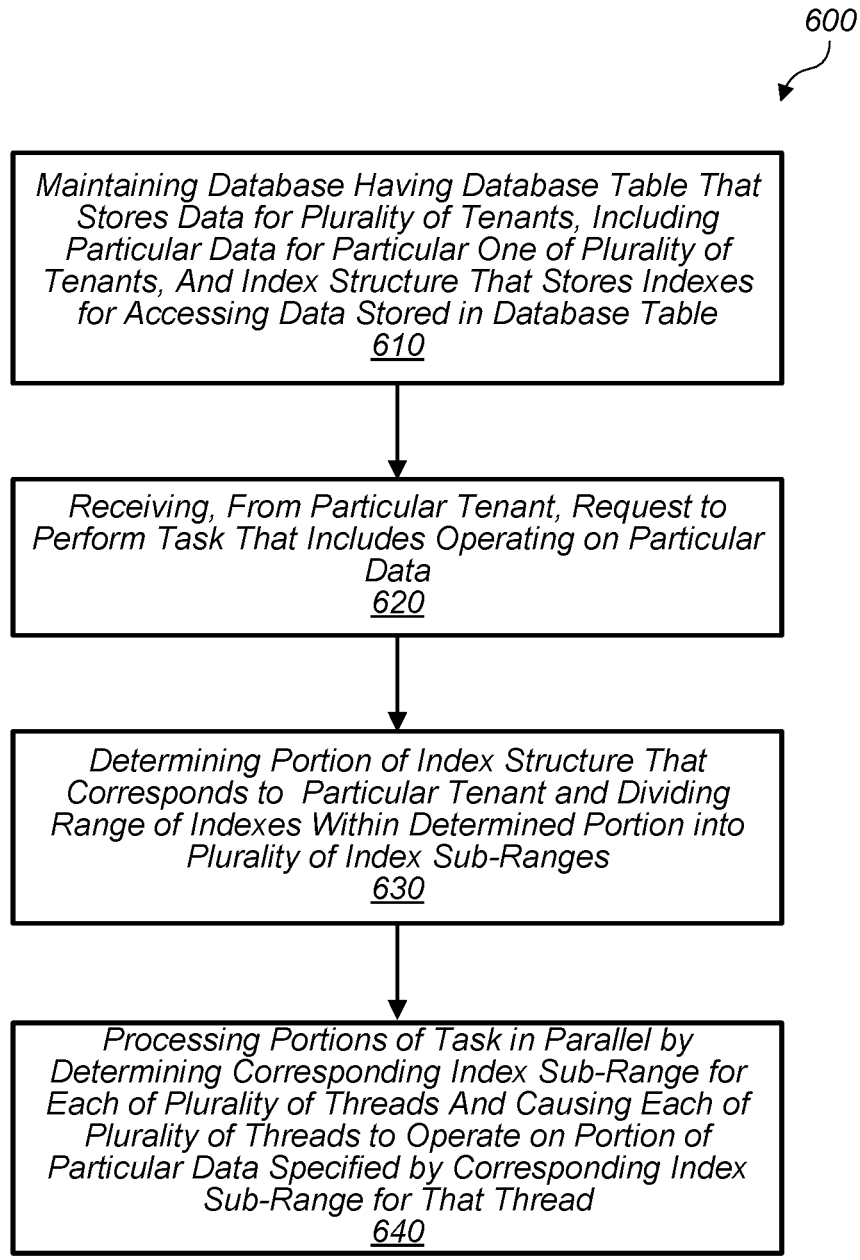
FIG. 6-8 are flow diagrams illustrating example methods that relate to processing data in a parallelized manner, according to some embodiments.

Turning now to FIG. 6, a flow diagram of a method 600 is shown. Method 600 is one embodiment of a method performed by a computer system (e.g., system 100) to process data identified in a request (e.g., request 132). Method 600 may be performed by executing program instructions that implement application 130. In some embodiments, method 600 includes additional steps such as notifying the requestor that the particular request has been completed.

Method 600 begins in step 610 with a computer system maintaining a database having: a database table (e.g., table 110) that stores data for a plurality of tenants, including particular data for a particular one of the plurality of tenants, and an index structure (e.g., index structure 120) that stores indexes (e.g., indexes 122) for accessing data stored in the database table. In some embodiments, the indexes stored in the index structure correspond to a respective one of the plurality of tenants. The index structure may further be arranged such that the indexes are ordered by tenant. In step 620, the computer system receives, from the particular tenant, a request to perform a task that includes operating on the particular data;

In step 630, the computer system determines a portion of the index structure that corresponds to the particular tenant and divides a range of indexes (e.g., index range 210) within the determined portion into a plurality of index sub-ranges (e.g., index sub-ranges 220). In some embodiments, the computer system causes two or more of a plurality of threads (e.g., threads 135 serving as slicers 136) to each divide indexes in a respective index segment of the range of indexes into one or more of the plurality of index sub-ranges (e.g., parallelize the slicing of index range 210 among multiple slicers 136). The dividing of the range of indexes may be performed according to a system parameter that specifies a size for ones of the plurality of index sub-ranges. In various embodiments, the computer system maintains one or more queues (e.g., queues 310) for storing indications (e.g., slice tasks 124) of the plurality of index sub-ranges.

In step 640, the computer system processes portions of the task (specified in the received request) in parallel by determining a corresponding index sub-range for each of the plurality of threads and by causing each of the plurality of threads (which have been previously assigned to divide indexes) to operate on a portion of the particular data specified by the corresponding index sub-range for that thread. In response to a time spent processing a particular index sub-range exceeding a defined amount of time, in some embodiments, the computer system causes one of the plurality of threads that corresponds to the particular index sub-range to split the particular index sub-range into two or more additional index sub-ranges. In such embodiments, the computer system may cause ones of the plurality of threads to operate, in parallel, on portions of the particular data corresponding to the two or more additional index sub-ranges. The determining of the corresponding index sub-range for each of the plurality of threads may include each of the plurality of threads retrieiving an indication from the one or more queues where the retrieved indication specifies the corresponding index sub-rage for that thread.

The previous paragraph makes reference to "each" of a plurality of threads operating on a portion of the particular data specified by the corresponding index sub-range for that thread. There of course may be other threads in the system performing other tasks, and thus these threads do not have some corresponding index sub-range for that thread.

In various embodiments, causing each of the plurality of threads to operate on a portion of the particular data includes a particular thread of the plurality of threads ceasing processing of the index sub-range corresponding to that particular thread and storing an indication of an unprocessed portion of the index sub-range for processing by a different one of the plurality of threads. In some embodiments, the dividing of the range of indexes into the plurality of index sub-ranges occurs at least partially in parallel with the processing of the portions of the task.

Figure 7:
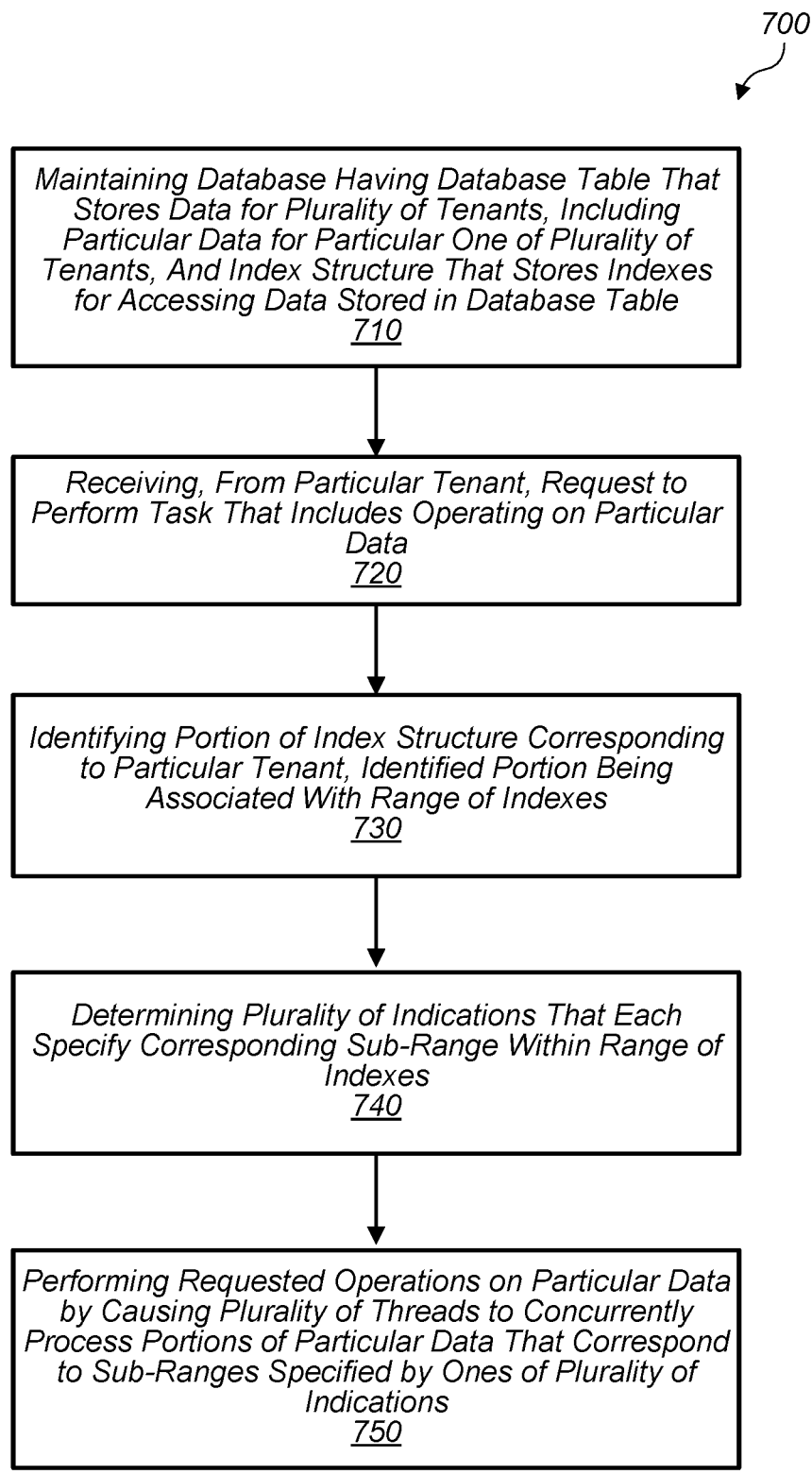

Turning now to FIG. 7, a flow diagram of a method 700 is shown. Method 700 is one embodiment of a method performed by a computer system (e.g., system 100) to process a request (e.g., request 132) to operate on data. Method 700 may be performed by executing program instructions that implement application 130. In some embodiments, method 700 includes additional steps such as notifying the requestor that the particular request has been completed.

Method 700 begins in step 710 with a computer system maintaining a database having: a database table (e.g., table 110) that stores data for a plurality of tenants, including particular data for a particular one of the plurality of tenants, and an index structure (e.g., index structure 120) that stores indexes (e.g., indexes 122) for accessing data stored in the database table. In step 720, the computer system receives, from the particular tenant, a request to perform operations on the particular data. In step 730, the computer system identifies a portion of the index structure corresponding to the particular tenant, the identified portion being associated with a range of indexes (e.g., index range 210).

In step 740, the computer system determines a plurality of indications (e.g., slice tasks 124) that each specify a corresponding sub-range (e.g., index sub-range 220) within the range of indexes. In some embodiments, the computer system enqueues the plurality of indications in one or more queues (e.g., queue 310) accessible to plurality of threads (e.g., threads 135). Ones of the plurality of indications may be enqueued as the indications are determined without waiting for all of the plurality of indications to be determined. The determining of the plurality of indications may include dividing the range of indexes into the plurality of sub-ranges such that each of the plurality of sub-ranges is limited to referencing a maximum number of rows in the database table. In some embodiments, the particular number of rows is specified in the request from the particular tenant.

In step 750, the computer system performs the requested operations on the particular data by causing a plurality of threads to concurrently process portions of the particular data that correspond to sub-ranges specified by ones of the plurality of indications. The performing of the requested operations on the particular data may include causing ones of the plurality of threads to retrieve an indication from the one or more queues and operate on data referenced by the sub-range specified in the retrieved indication. In some embodiments, the computer system maintains information defining: a number of indications that have been determined and a number of indications that have been processed. In response to the number of indications that have been determined matching the number of indications that have been processed, the computer system sends a notification, to the particular tenant, indicating that the request has been completed.

Figure 8:
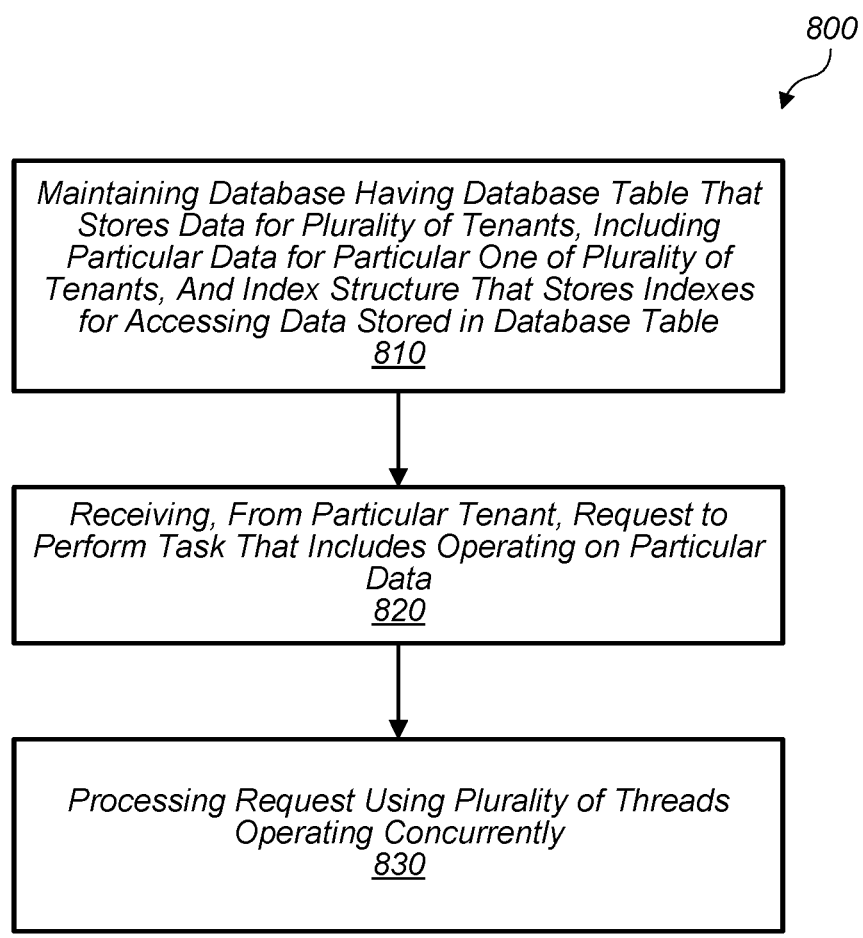

Turning now to FIG. 8, a flow diagram of a method 800 is shown. Method 800 is one embodiment of a method performed by a computer system (e.g., system 100) to process a request (e.g., request 132) to operate on data. Method 800 may be performed by executing program instructions that implement application 130. In some embodiments, method 800 includes additional steps such as notifying the requestor that the particular request has been completed.

Method 800 begins in step 810 with a computer system maintaining a database having: a database table (e.g., table 110) that stores data for a plurality of tenants, including particular data for a particular one of the plurality of tenants, and an index structure (e.g., index structure 120) that stores indexes (e.g., indexes 122) for accessing data stored in the database table. In step 820, the computer system receives, from the particular tenant, a request to perform operations on the particular data.

In step 830, the computer system processes the request using a plurality of threads (e.g., threads 135) operating concurrently. At least one of the plurality of threads, in some embodiments, is executable to: identify a portion of the index structure that corresponds to the particular tenant, the identified portion being associated with a range of indexes (e.g., index range 210); generate a plurality of tasks (e.g., slice tasks 124) that each specify a corresponding sub-range (e.g., sub-range 220) within the range of indexes; and store ones of the plurality of tasks in one or more processing queues (e.g., queues 310) as the tasks are generated. The at least one thread may perform the identifying, generating, and storing for a particular period of time and after the particular period of time has elapsed, store an indication of progression (e.g., a slicer task 410) in generating the plurality of tasks. In some embodiments, the computer system causes one of the plurality of threads to access the indication and to continue generating the plurality of tasks based on the indication. In various embodiments, the plurality of tasks are generated such that the number of tasks corresponds to the number of remaining threads. In some embodiments, the remaining ones of the plurality of threads are executable to: retrieve a task from the one or more processing queues and perform the requested operations on a portion of the particular data that corresponds to the sub-range specified by that retrieved task.

Exemplary Computer System

Figure 9:
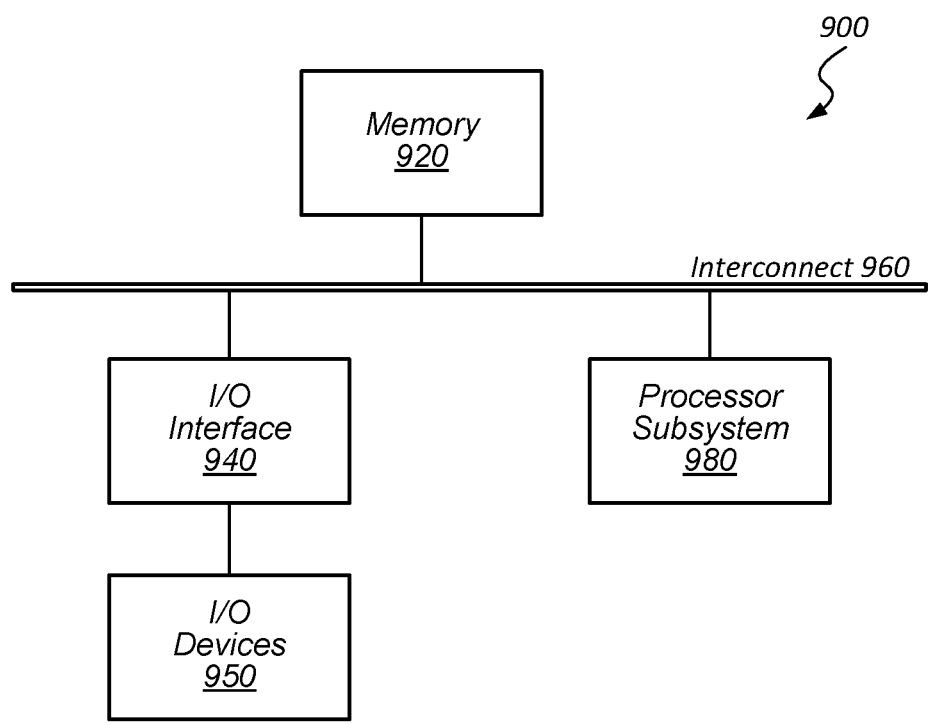
FIG. 9 is a block diagram illustrating an example computer system, according to some embodiments.

Turning now to FIG. 9, a block diagram of an exemplary computer system 900, which may implement system 100, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, application server 130 described above may include (or be included within) system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    maintaining, by a computer system, a database having:
        a database table that stores data for a plurality of tenants, including particular data for a particular one of the plurality of tenants; and
        an index structure that stores indexes for accessing data of the plurality of tenants that is stored in the database table;
    receiving, by the computer system from the particular tenant, a request to perform a task that includes operating on the particular data included in the database table;
    determining, by the computer system based on the index structure, a division of the task into a plurality of subtasks, wherein the determining includes:
        determining a portion of the index structure that corresponds to the particular tenant associated with the particular data; and
        dividing a range of indexes within the determined portion into a plurality of index sub-ranges designated by the plurality of subtasks; and
    processing, by the computer system, the plurality of subtasks in parallel, including by:
        determining a corresponding index sub-range for each of at least two of a plurality of threads;
        causing each of the at least two threads to operate on a portion of the particular data in the database table that is specified by the corresponding index sub-range for that thread, wherein the determining of the division of the task into the plurality of subtasks occurs at least partially in parallel with the processing of ones of the plurality of subtasks; and in response to determining that the plurality of subtasks has been processed, the computer system sending a notification to the particular tenant that the request has been completed.

2. The method of claim 1, further comprising:

in response to a time spent processing a particular index sub-range exceeding a defined amount of time, the computer system causing one of the plurality of threads corresponding to the particular index sub-range to split the particular index sub-range into two or more additional index sub-ranges; and causing, by the computer system, ones of the plurality of threads to operate, in parallel, on portions of the particular data corresponding to the two or more additional index sub-ranges.

3. The method of claim 1, wherein the dividing of the range of indexes includes:

causing, by the computer system, two or more of the plurality of threads to each divide indexes in a respective index segment of the range of indexes into one or more of the plurality of index sub-ranges.

4. The method of claim 1, wherein the dividing of the range of indexes is performed according to a system parameter that specifies a size for ones of the plurality of index sub-ranges.

5. The method of claim 1, further comprising:

maintaining, by the computer system, one or more queues for storing indications of the plurality of index sub-ranges, wherein the determining of the corresponding index sub-range for each of the at least two threads includes:

retrieving, by each of the at least two threads, an indication from the one or more queues, wherein the retrieved indication specifies the corresponding index sub-range for that thread.

6. The method of claim 1, wherein the causing of each of the at least two threads to operate on a portion of the particular data includes:

ceasing, by a particular thread of the at least two threads, processing of the index sub-range corresponding to the particular thread; and storing, by the particular thread, an indication of an unprocessed portion of the index sub-range for processing by a different one of the plurality of threads.

7. The method of claim 1, wherein the indexes stored in the index structure correspond to a respective one of the plurality of tenants, and wherein the index structure is arranged such that the indexes are ordered by tenant.

8. A non-transitory computer-readable medium having program instructions stored thereon that capable of causing a computer system to perform operations comprising:

maintaining a database having:

a database table that stores data for a plurality of tenants, including particular data for a particular one of the plurality of tenants; and an index structure that stores indexes for accessing corresponding data of the plurality of tenants that is stored in the database table; and receiving, from the particular tenant, a request to perform operations on the particular data included in the database table;

determining a division of the operations based on the index structure, including:

identifying a portion of the index structure corresponding to the particular tenant, the identified portion being associated with a range of indexes; and determining a plurality of indications that each specify a corresponding sub-range within the range of indexes;

performing, at least partially in parallel with the determining of the division, ones of the requested operations on the particular data in the database table by causing a plurality of threads to concurrently process portions of the particular data that correspond to sub-ranges specified by ones of the plurality of indications; and in response to determining that the plurality of indications has been processed, sending a notification to the particular tenant that the request has been completed.

9. The non-transitory computer-readable medium of claim 8, wherein the operations further comprise:

enqueueing the plurality of indications in one or more queues accessible to the plurality of threads, wherein ones of the plurality of indications are enqueued before all of the plurality of indications are determined.

10. The non-transitory computer-readable medium of claim 9, wherein the performing of the requested operations on the particular data includes causing ones of the plurality of threads to:

retrieve an indication from the one or more queues; and operate on data referenced by an index sub-range specified in the retrieved indication.

11. The non-transitory computer-readable medium of claim 8, wherein the determining of the plurality of indications includes dividing the range of indexes into a plurality of sub-ranges such that each of the plurality of sub-ranges is limited to referencing a maximum number of rows in the database table.

12. The non-transitory computer-readable medium of claim 11, wherein the maximum number of rows is specified in the request from the particular tenant.

13. A non-transitory computer-readable medium having program instructions stored thereon that are capable of causing a computer system to perform operations comprising:

maintaining a database having:

a database table that stores data for a plurality of tenants, including particular data for a particular one of the plurality of tenants; and an index structure that stores indexes for accessing corresponding data of the plurality of tenants that is stored in the database table; and receiving, from the particular tenant, a request to perform requested operations on the particular data included in the database table; and processing the request using a plurality of threads operating at least partially in parallel, wherein at least one of the plurality of threads is executable to:

determine a division of the requested operations based on the index structure, including:

identifying a portion of the index structure that corresponds to the particular tenant, the identified portion being associated with a range of indexes;

generating a plurality of tasks that each specify a corresponding sub-range within the range of indexes; and storing ones of the plurality of tasks in one or more processing queues as the tasks are generated, wherein the remaining ones of the plurality of threads are executable to:
    retrieve a task from the one or more processing queues; and
    perform the requested operations on a portion of the particular data in the database table that corresponds to the sub-range specified by that retrieved task; and
in response to determining that the plurality of tasks has been processed, sending a notification to the particular tenant that the request has been completed.

14. The non-transitory computer-readable medium of claim 13, wherein the at least one of the plurality of threads is executable to:
    perform the identifying, generating, and storing for a particular period of time; and
    after the particular period of time has elapsed, store an indication of progression in generating the plurality of tasks, wherein the indication is accessible to the plurality of threads.

15. The non-transitory computer-readable medium of claim 14, wherein the operations further comprise:
    causing one of the plurality of threads to access the indication and to continue generating the plurality of tasks based on the indication.

16. The non-transitory computer-readable medium of claim 13, wherein one of the remaining threads is executable to:
    in response to a time spent processing a particular task exceeding a defined amount of time, generate a plurality of sub-tasks that each specify a range within the sub-range specified by the particular task; and
    store the plurality of sub-tasks in the one or more processing queues.

17. The non-transitory computer-readable medium of claim 13, wherein the plurality of tasks are generated such that the number of tasks is greater than the number of remaining threads.

* * * * *